United States Patent [19]
Mangano et al.

[11] Patent Number: 5,947,144
[45] Date of Patent: Sep. 7, 1999

[54] DIAPHRAGM ACTUATED ABSOLUTE PRESSURE REGULATOR

[75] Inventors: Roy A. Mangano; Paul M. Lyons, both of Tucson, Ariz.

[73] Assignee: Raytheon Company, Lexington, Mass.

[21] Appl. No.: 08/975,837

[22] Filed: Nov. 21, 1997

[51] Int. Cl.⁶ ............................................. F16K 31/365
[52] U.S. Cl. .................. 137/81.1; 137/899.2; 251/335.2
[58] Field of Search ................ 137/81.1, 899.2; 251/335.2

[56] References Cited

U.S. PATENT DOCUMENTS

| | | | |
|---|---|---|---|
| 2,345,547 | 3/1944 | Roth et al. | 137/81.1 |
| 2,437,187 | 3/1948 | Eshbaugh | 137/81.1 |
| 2,571,667 | 10/1951 | Bondurant | 137/81.1 |
| 2,639,726 | 5/1953 | Golob | 137/81.1 |
| 4,066,091 | 1/1978 | Itoh et al. | 137/81.1 |
| 4,199,850 | 4/1980 | Velan | 251/335.2 |

*Primary Examiner*—A. Michael Chambers
*Attorney, Agent, or Firm*—Andrew J. Rudd; David W. Collins; Glenn H. Lenzen, Jr.

[57] ABSTRACT

A diaphragm pressure regulator comprising a housing having first and second sections. The first section 1a has a cavity or vacuum space, and a wave spring is disposed in the vacuum space, a load distributor is disposed adjacent to the wave spring, and a diaphragm seals the cavity and secures the wave spring and load distributor in the cavity. The second section of the housing comprises a movable and sealable vent stem that moves in response to movement of the diaphragm, and a vent opening for venting the interior of the second section of the housing to external pressure in response to motion of the diaphragm. The diaphragm pressure regulator may be preferentially used in an upper atmospheric system that needs to maintain a specified pressure, but requires venting capabilities. Such systems include missile systems that fly into the upper atmosphere.

5 Claims, 1 Drawing Sheet

DIAPHRAGM ACTUATED ABSOLUTE PRESSURE REGULATOR

BACKGROUND

The present invention relates generally to pressure regulators, and more particularly, to a diaphragm pressure regulator.

The assignee of the present invention manufactures missile systems that use a focal plane array infrared sensor that requires cooling to approximately 90° K. The focal plane array and infrared sensor is disposed within a compartment on the missile. The temperature of the focal plane array and infrared sensor must be maintained within a few tenths of a degree Kelvin for precise target acquisition. Joule-Thomson coolers using argon or nitrogen gas are employed to cool the focal plane array infrared sensor. A constant supply of gas vents into the compartment housing the focal plane array infrared sensor from the Joule-Thomson cooler which must be vented.

During cooldown, large variations in the pressure within the compartment housing the focal plane array infrared sensor would result in temperature excursions due to the thermodynamic properties of the gas that is supplied to the Joule-Thomson cooler. Pressure variations can occur due to ascent venting. A pressure regulator is required on high altitude missiles, and specifically those that travel to altitudes in excess of 60,000 feet, to prevent over or under venting of the compartment housing the focal plane array infrared sensor.

The currently used pressure regulator design incorporates bellows to regulate the flow of gas. Vacuum is drawn on the bellows, and the bellows are spring loaded to apply a force equivalent to that which would be applied by atmospheric pressure at sea level (14.696 psia). Welded bellows are costly, require a great deal of space, and are unreliable because of the many welds that are required to manufacture the bellows. It has been found that after several uses, the bellows have been found to leak, thus relieving the internal vacuum within the bellows.

Accordingly, it is an objective of the present invention to provide for a diaphragm pressure regulator. It is a further objective of the present invention to provide for a diaphragm pressure regulator that may be used to vent a compartment housing a focal plane array infrared sensor employed on a high altitude missile system.

SUMMARY OF THE INVENTION

To meet the above and other objectives, the present invention provides for a diaphragm pressure regulator, and in particular one that may be used to vent a compartment housing a focal plane array infrared sensor employed on a high altitude missile system. The diaphragm pressure regulator comprises a housing having first and second sections. The first section has a cavity 18 or vacuum space, and a wave spring is disposed in the vacuum space, a load distributor is disposed adjacent to the wave spring, and a diaphragm seals the cavity and secures the wave spring and load distributor in the cavity. The second section of the housing comprises a movable and sealable vent stem that moves in response to movement of the diaphragm, and a vent opening for venting the interior of the second section of the housing to external pressure in response to motion of the diaphragm.

The design of the diaphragm pressure regulator varies from current design technologies in that it utilizes a diaphragm for pressure regulation instead of bellows. In the present invention, a single diaphragm replaces the bellows of the predecessor regulator. The present diaphragm regulator only requires one weld line, thus reducing construction costs and increasing the robustness. The present diaphragm regulator is also more compact than its predecessor, thus reducing weight, and simpler to construct, thus reducing cost.

The diaphragm pressure regulator may be used in any upper atmospheric system that needs to maintain a specified pressure, but requires venting capabilities to prevent overpressurization. Typical systems include missile systems, such as certain ones manufactured by the assignee of the present invention, that fly into the upper atmosphere.

BRIEF DESCRIPTION OF THE DRAWINGS

The various features and advantages of the present invention may be more readily understood with reference to the following detailed description taken in conjunction with the accompanying drawings, wherein like reference numerals represent like structural elements, and in which.

DETAILED DESCRIPTION

Figure 1:
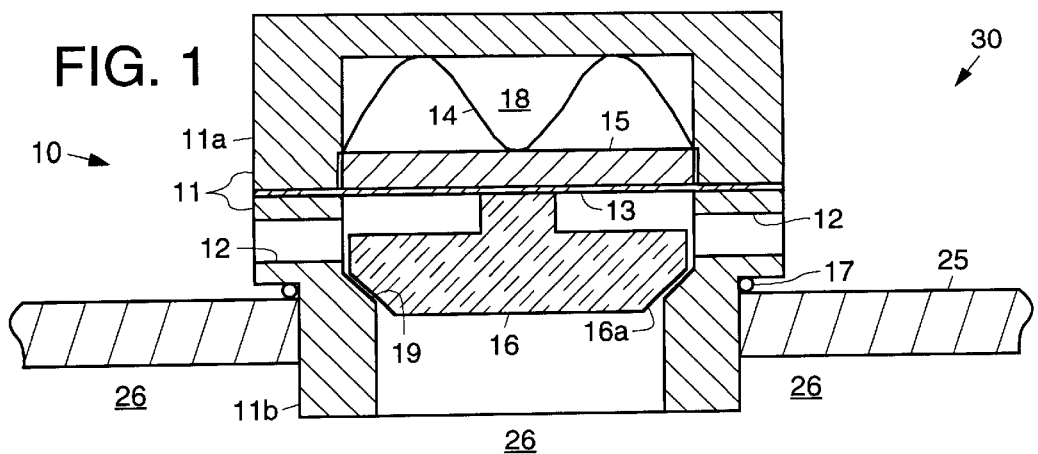
FIG. 1 illustrates a diaphragm pressure regulator in accordance with the principles of the present invention.

Referring to the drawing figures, FIG. 1 illustrates a diaphragm pressure regulator 10 in accordance with the principles of the present invention. The diaphragm pressure regulator 10 may be used to vent a compartment 25 of a missile 30 that houses a focal plane array infrared sensor, for example. The sensor is cooled using a Joule-Thomson cooler (not shown), for example, to temperature that must be maintained with little or no temperature variation if accurate target acquisition it to be achieved. During the cooldown cycle, the pressure in the compartment 25 housing the focal plane array infrared sensor must remain substantially constant, and this constant pressure is usually atmospheric pressure at sea level.

The diaphragm pressure regulator 10 comprises a housing 11 having first and second sections 11a, 11b. The first section 11a of the housing 11 has a cavity 18 or vacuum space 18 in which a wave spring 14 is disposed. A load distributor 15 is disposed in the cavity 18 against the wave spring 14. A diaphragm 13 is sealed, such as by electron beam welding, for example, to the first section 11a of the housing 11 and abuts the load distributor 15 to secure the wave spring 14 and load distributor 15 in the cavity 18.

The second section 11b of the housing 11 has a stepped configuration with a chamfered seating surface 19. A chamfered movable plug 16 or vent stem 16 is disposed within the second section 11b of the housing 11 and has a chamfered vent surface 16a that abuts the chamfered seating surface 19 in the second section 11b of the housing 11. One or more vent openings 12 are disposed through the second section 11b of the housing 11 to vent the interior thereof so that it is exposed to external pressure.

The diaphragm pressure regulator 10 is disposed in an opening in the compartment 25 housing the focal plane array infrared sensor. A bulkhead seal 17 is provided between the diaphragm pressure regulator 10 and the compartment 25. The diaphragm pressure regulator 10 thus provides a means for venting the interior 26 of the compartment 25 and to thus keep the pressure therein substantially constant.

By way of example, in a missile application, for example, for pressure control during venting, the diaphragm pressure regulator 10 is used on a high altitude missile 30 to prevent over-venting of the compartment 25 that houses the focal plane array infrared sensor, which would cause temperature excursion due to the dependence of liquid boiling temperature on pressure. Likewise, the compartment must vent to prevent over pressurization, which would result in temperature excursions (or compartment structural failure due to bursting of the compartment 25). A vacuum reference is provided by the first section 11a of the housing 11, and the wave spring 14 in conjunction with the load distributor 15 are used to apply a load to the vent stem 16 that is equivalent to the required compartment pressure.

Figure 2:
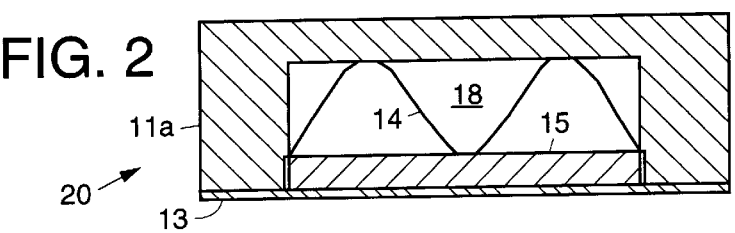
FIG. 2 illustrates a diaphragm assembly of the diaphragm pressure regulator.

FIG. 2 illustrates a diaphragm assembly 20 that provides the vacuum reference of the diaphragm pressure regulator 10. A single diaphragm 13 replaces the conventionally used bellows, thus simplifying manufacturing. The diaphragm assembly 20 houses the wave spring 14 and load distributor 15. The diaphragm 13 is electron beam welded under vacuum to the first section 11a of the housing to produce an evacuated assembly, thus insuring the presence of a vacuum within the cavity 18.

Figure 3:
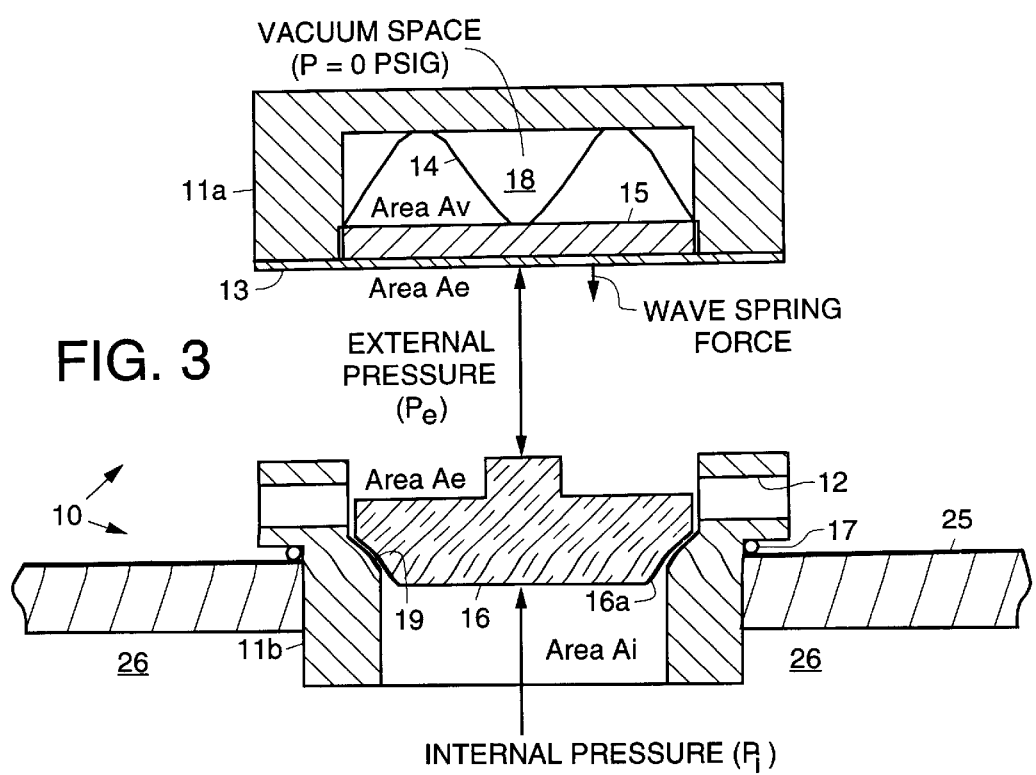
FIG. 3 depicts diaphragm force balancing in the diaphragm pressure regulator.

FIG. 3 illustrates force balancing of the diaphragm 13 used in the diaphragm pressure regulator 10 of FIG. 1. A force balance in the pressure regulator is given by the equation:

$$F_{ws} = P_i * A_i,$$

where $F_{ws}$ is the force exerted by the wave spring 14, $P_i$ is the pressure in the interior 26 of the compartment 25, and $A_i$ is the area of the load distributor 15 within the cavity 18.

The external pressure ($P_e$) applies an equal force to the diaphragm assembly 20 and the vent stem 16, and thus has no effect on the system. Therefore, the wave spring 14 is selected to yield an equivalent force to that applied by the pressure in the interior 26 of the compartment 25 to maintain pressure of 14.7 psia. As the altitude of the missile 30 increases, the external pressure decreases. The diaphragm pressure regulator 10 only allows venting if the compartment pressure is greater than 14.7 psia. Otherwise, the diaphragm pressure regulator 10 remains closed. It should also be noted that in this design, unlike the bellows design, the vent stem 16 will close if an external pressure rise occurs that is greater than the internal pressure of 14.7 psia. This may occur when the missile 30 passes through the first transonic (speed of sound).

Thus, cooling apparatus comprising a pressure activated Joule-Thomson valve flow controller has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A pressure regulator comprising:

a housing having first and second sections;

wherein the first section comprises:

a cavity comprising a vacuum space;

a wave spring disposed in the vacuum space;

a load distributor disposed in the cavity adjacent to the wave spring;

a diaphragm sealed to the first section of the housing that abuts the load distributor and secures the wave spring and load distributor in the cavity;

and wherein the second section of the housing comprises a movable and sealable vent stem; and a vent opening for venting the interior of the second section of the housing to external pressure in response to motion of the diaphragm.

2. The pressure regulator of claim 1 wherein the diaphragm is electron beam welded to the first section of the housing.

3. The pressure regulator of claim 1 wherein the interior of the second section of the housing has a chamfered seating surface, and wherein the vent stem is chamfered to match the chamfered seating surface.

4. The pressure regulator 10 of claim 1 wherein the housing is connected to a compartment of a missile, for venting the compartment as a function of pressure.

5. The pressure regulator of claim 4 further comprising a bulkhead seal disposed between the housing and the compartment.

* * * * *